(12) United States Patent
Matsumiya et al.

(10) Patent No.: US 7,929,399 B2
(45) Date of Patent: Apr. 19, 2011

(54) OPTICAL PICKUP DEVICE AND OPTICAL DISC DEVICE

(75) Inventors: Hiroaki Matsumiya, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 227 days.

(21) Appl. No.: 12/334,698

(22) Filed: Dec. 15, 2008

(65) Prior Publication Data
US 2009/0154323 A1 Jun. 18, 2009

(30) Foreign Application Priority Data
Dec. 17, 2007 (JP) ................................ 2007-324341

(51) Int. Cl.
*G11B 7/135* (2006.01)
(52) U.S. Cl. ................................ 369/112.05
(58) Field of Classification Search ........................ None
See application file for complete search history.

(56) References Cited

U.S. PATENT DOCUMENTS

| | | | | |
|---|---|---|---|---|
| 5,239,529 A | * | 8/1993 | Tobita et al. | 369/47.32 |
| 5,519,685 A | * | 5/1996 | Kato et al. | 369/112.19 |
| 5,673,245 A | * | 9/1997 | Yanagawa et al. | 369/112.29 |
| 5,754,513 A | * | 5/1998 | Yagi et al. | 369/53.22 |
| 2002/0027840 A1 | * | 3/2002 | Morishita et al. | 369/44.23 |
| 2002/0126588 A1 | * | 9/2002 | Katayama | 369/44.23 |
| 2004/0001419 A1 | * | 1/2004 | Ariyoshi et al. | 369/112.04 |
| 2005/0274870 A1 | * | 12/2005 | Katayama | 250/201.5 |
| 2007/0171786 A1 | * | 7/2007 | Kobayashi et al. | 369/44.37 |

FOREIGN PATENT DOCUMENTS

| | | | |
|---|---|---|---|
| JP | 06036374 A | * | 2/1994 |
| JP | 2001-307351 | | 11/2001 |
| JP | 2007-172793 | | 7/2007 |

* cited by examiner

*Primary Examiner* — Peter Vincent Agustin
(74) *Attorney, Agent, or Firm* — Renner, Otto, Boisselle & Sklar, LLP

(57) ABSTRACT

When recording on and/or reproducing from an information recording medium having a plurality of recording layers is performed, there has been a problem in appropriately detecting a control signal at the time of the recording and/or reproducing, since reflected light from a recording layer, which does not undergo the recording and/or reproducing, enters a photodetector concurrently with reflected light from a recording layer which undergoes the recording and/or reproducing. In the present invention, a polarization hologram is used to diffract light outputted from a light source and to generate a main beam, which is a zeroth-order light beam, and a pair of sub beams, which is a positive first-order light beam and a negative first-order light beam each having a polarization direction perpendicular to a polarization direction of the main beam. Accordingly, it is possible to prevent the reflected sub beams from a recording layer, which is a target undergoing recording and/or reproducing, from interfering with the reflected main beam from a recording layer, which is a non-target not undergoing the recording and/or reproducing. Therefore, it is possible to obtain an accurate control signal based on the sub beams, and also possible to realize an optical pickup device having a preferable recording performance.

13 Claims, 5 Drawing Sheets

OPTICAL PICKUP DEVICE AND OPTICAL DISC DEVICE

BACKGROUND OF THE INVENTION

1. Field of the Invention

The present invention relates to an optical pickup device and/or an optical disc device which is capable of optically recording information on and reproducing the information from an information recording medium such as an optical disc by using a laser source.

2. Description of the Background Art

In recent years, among DVDs and next-generation high-density optical discs, an optical disc having two or more recording layers has been proposed in order to increase a recording capacity per optical disc.

FIG. 1 is a block diagram showing a basic configuration of an optical pickup device. FIG. 8 is a block diagram showing a configuration of a conventional optical system used in the optical pickup device, the optical system corresponding to reference character 13 shown in FIG. 1.

The optical pickup device shown in FIG. 1 records information on and reproduces the information from an optical disc 206 having two information recording layers, i.e., a first information recording layer 206a and a second information recording layer 206b. In the optical system 13 shown in FIG. 8, three beams, i.e., a zeroth-order diffracted ray (main beam), and two first-order diffracted rays (sub beams) are generated by a diffraction grating 202 which is arranged in an optical path of a light beam outputted from the laser source 201. The two first-order diffracted rays are located on both sides of the zeroth-order diffracted ray. The generated three beams pass through a beam splitter 203, a collimator lens 204, and an objective lens 205, and then form three light spots on the first information recording layer 206a of the optical disc 206. In this case, suppose that the beams are in focus on the first information recording layer 206a. A reflected main beam and reflected sub beams, which are reflected by the first information recording layer 206a of the optical disc 206, pass through the objective lens 205, the beam splitter 203, and the detection lens 207, and then enters a photodetector 208.

FIG. 3 shows, in detail, a configuration of the photodetector 208 shown in FIG. 1. As shown in FIG. 3, the photodetector 208 includes a main beam detecting section 301 which receives the reflected main beam 30 reflected from the optical disc 206, and sub beam detecting sections 302 and 303 which respectively receive the reflected sub beams 31 and 32 reflected from the optical disc 206. The photodetector 208 performs photoelectric conversion on the each of the light beams received at each of the detecting section, and outputs an electrical signal corresponding to intensity of each of the light beams.

The main beam detecting section 301 and the sub beam detecting sections 302 and 303 are respectively divided into four detecting elements. The divided detecting elements 301a, 301b, 301c, 301d, 302e, 302f, 302g, 302h, 303i, 303j, 303k, and 303l output signals A, B, C, D, E, F, G, H, I, J, K, and L, respectively. By using the signals A to L, a focusing error signal FE is detected by a known astigmatic method, and a tracking error signal TE is detected by a known push-pull method. More specifically, in accordance with the signals A to D outputted from the main beam detecting section 301, a main signal calculation circuit 304 generates a main push-pull (MPP) signal and a main focusing error (MFE) signal. In accordance with the signals E to L outputted from the sub beam detecting sections 302 and 303, a sub signal calculation circuit 305 generates a sub push-pull (SPP) signal and a sub focusing error (SFE) signal. The control signal calculation circuit 306 generates a tracking error (TE) signal, a focusing error (FE) signal, and an information (RF) signal.

The aforementioned calculations performed in the main signal calculation circuit 304, the sub signal calculation circuit 305, and the control signal calculation circuit 306 are executed according to the following equations 1 to 7.

$$MPP=(A+D)-(B+C) \quad (1)$$

$$MFE=(A+C)-(B+D) \quad (2)$$

$$SPP=\{(E+G)-(F+H)\}+\{(I+K)-(J+L)\} \quad (3)$$

$$SFE=\{(E+H)-(F+G)\}+\{(I+L)-(J+K)\} \quad (4)$$

$$TE=MPP-\alpha \times SPP \quad (5)$$

$$FE=MPP+\beta \times SPP \quad (6)$$

$$RF=A+B+C+D \quad (7)$$

Wherein, $\alpha$ and $\beta$ represent constant numbers.

In accordance with the TE signal and the FE signal, which are generated by the control signal calculation circuit 306 in the photodetector 208, a control signal processing circuit 101 shown in FIG. 1 outputs a control signal to an objective lens drive circuit 102 so as to drive an objective lens drive unit 103, and causes the objective lens 205 to move in a thickness direction and a radial direction of the optical disc 206.

One of techniques relating to the above-described optical pickup device is disclosed in Japanese Laid-Open Patent Publication No. 2001-307351.

SUMMARY OF THE INVENTION

In the above description, light is in focus on the first information recording layer 206a. However, in addition to light reflected from the first information recording layer 206a, there is light which enters the second information recording layer 206b in a defocused state, and reflected from the second information recording layer 206b. The latter light also passes through the objective lens 205, the beam splitter 203 and the detection lens 207, and then enters the photodetector 208. Of the light beams reflected from the second information recording layer 206b, a reflected main beam 40 enters the photodetector 208 in a defocused state, as shown in FIG. 4, and then enters all the light detecting elements 301a, 301b, 301c, 301d, 302e, 302f, 302g, 302h, 303i, 303j, 303k, and 303l, which are included in the photodetector 208.

Generally, light which is used as a laser source 201 and outputted from a semiconductor laser is linearly polarized light which is polarized in a predetermined direction. In FIG. 8, suppose a case where the light outputted from the laser source 201 is polarized in a direction along an X-axis shown in the drawing. The light outputted from the laser source 201 is split by a diffraction grating 202 into a main beam and sub beams, but the polarization direction of each of the beams does not change. The main beam and the sub beams are reflected by the beam splitter 203, whereby the polarization direction of each of the beams which travel toward the optical disc 206 changes to a direction along a Z-axis. The main beam and sub beams, which are converged on the optical disc 206 via the collimator lens 204 and the objective lens 205, are reflected from the optical disc 206, and transmit through the objective lens 205, the collimator lens 204, and beam splitter 203, while keeping the polarization direction along the Z-axis, in the same manner as the incident light, and enter the photodetector 208 via the detection lens 207. Therefore, the reflected main beam 30, the reflected sub beams 31 and 32 from the first information recording layer 206a of the optical disc 206, and reflected main beam 40 from the second information recording layer 206b have a common polarization direction along the Z-axis.

Here, in the case where there is a plurality of light beams having various polarization directions, interference will occur among such light beams that have a common polarization direction. When the light interference occurs, light intensity of each of the light beams is superimposed with one another in accordance with a phase of each of the light beams at a measuring point. Accordingly, if the light beams are in phase, the light intensity of each of the light beams is added up, whereas if the light beams are in opposite phase to one another, the light intensity is cancelled with one another. In this manner, the light intensity is increased or decreased.

Accordingly, on the main beam detecting section 301, the reflected main beam 30 from the first information recording layer 206a interferes with a part of the reflected main beam 40 from the second information recording layer 206b. On the sub beam detecting section 302, the reflected sub beam 33 from the first information recording layer 206a interferes with a part of the reflected main beam 40 from the second information recording layer 206b. Further, on the sub beam detecting section 303, the reflected sub beam 32 from the first information recording layer 206a interferes with a part of the reflected main beam 40 from the second information recording layer 206b. As a result, on each of the detecting sections, the light intensity is increased or decreased.

The light outputted from the semiconductor laser, which is used as the laser source 201, has a continuous light intensity distribution, in which the light intensity is the strongest at the center of the light, and the light intensity decreases as distance from the center increases. Therefore, each of the main beam and the sub beams, which are generated by the diffraction grating 202, maintains the continuous light intensity distribution, and is converged on the optical disc 206. The continuity of the light intensity distribution of each of the reflected main beam and the reflected sub beams which enter the photodetector 208 after reflection is also maintained.

However, in the conventional optical pickup device, the light interference occurs among the reflected light beams 30, 31, 32, and 40 on the detecting sections 301, 302, and 303. In addition, the light beams interfering with each other have various phases, which have irregular and discontinuous correlations. Therefore, the light intensity increases or decreases irregularly as well as discontinuously. As a result, the light intensity distribution of the light beams detected by the detecting sections 301, 302, and 303 are each irregular and discontinuous, unlike the intensity distribution of the reflected light beams 30, 31, 32 and 40.

As above described, the conventional optical pickup device detects the reflected light having a continuous light intensity distribution, in which the light intensity is the strongest at the center of the light and the light intensity decreases as distance from the center increases, and controls tracking and focusing by using a TE signal and a FE signal which are generated in accordance with equations 1 to 6. In this case, if the light beams detected by the sub beam detecting sections 302 and 303 suffer from interference and consequently have irregular and discontinuous light intensity distributions, it is impossible to obtain the SPP signal and the SFE signal, which are generated from the reflected sub beams from the first information recording layer 206a, in accordance with equations 3 and 4.

On the other hand, the reflected main beam 40 from the second information recording layer 206b enters the detecting sections 301, 302, and 303 in a defocused state, and thus the light intensity of the reflected main beam 40 is smaller than that of the reflected main beam 30 from the first information recording layer 206a. Accordingly, the increase or decrease in the light intensity which is caused by the interference between the reflected main beam 40 and the reflected main beam 30 on the main beam detecting section 301 is significantly small. That is, the reflected main beam 40 hardly affects the continuity of the intensity distribution of the reflected main beam 30, and thus, it is possible to appropriately obtain an MPP signal and an MFE signal generated from the reflected main beam 30 reflected from the first information recording layer 206a.

In the conventional optical pickup device, a light intensity ratio of the main beam to each sub beam is generally set approximately to 10:1. In this case, the light intensity ratio of the reflected main beam 40 to the reflected main beam 30 is approximately one tenth of the light intensity ratio of the reflected main beam 40 to the reflected sub beam 32 or 33. That is, the irregular and discontinuous increase or decrease in the light intensity caused by the light interference affects the light intensity distribution of each of the reflected sub beams 32 and 33 ten times as greatly as the reflected main beam 40 affects the light intensity distribution of the reflected main beam 30. Therefore, in the conventional optical pickup device, the MPP signal and the MFE signal can be generated appropriately, whereas the SPP signal and the SFE signal are generated inaccurately. Accordingly, since appropriate control signals cannot be obtained to generate the TE signal and the FE signal in accordance with equations 5 and 6, and thus there has been a problem of deterioration in a recording and/or reproducing performance.

The present invention is made to solve the above-described problem, and characterized by causing the polarization direction of the main beam and that of the sub beams to be perpendicular to each other, thereby preventing the interference between the reflected sub beams from information recording layer which is a target for recording and/or reproducing, and the reflected main beam from the information recording layer which is a non-target for recording and/or reproducing. Accordingly, a stable control signal can be obtained, and thus tracking and focusing can be controlled stably. As a result, an optical pickup device having a preferable recording and/or reproducing performance can be obtained.

More specifically, the optical pickup device of the present invention performs at least one of reproduction, recording and deletion of information on an optical disc having a plurality of recording layers and includes: a light source; diffraction means for generating a main beam and a pair of sub beams by diffracting at least a part of the light outputted from the light source, the main beam being a zeroth-order light beam, and the pair of sub beams being a positive first-order light beam and a negative first-order light beam which are located on both sides of the zeroth-order light beam and each has a polarization direction approximately perpendicular to a polarization direction of the main beam; an objective lens for converging the main beam and the pair of sub beams, which are diffracted by the diffraction means, on a desired one of the plurality of recording layers, first photo-detection means for detecting the main beam which is converged by the objective lens and then reflected from the optical disc; and second photo-detection means for detecting the sub beams which are converged by the objective lens and then reflected from the optical disc.

According to the above-described configuration, it is possible to stably detect control signals such as a tracking error signal and a focusing error signal, and thus a preferable recording and/or reproducing performance can be realized.

Further, the optical pickup device of the present invention may include beam intensity ratio adjusting means for controlling a polarization direction of light entering the diffraction means and for adjusting a light intensity ratio of the main beam to the sub beams, which are generated by the diffraction means, to a predetermined value.

Further, the optical pickup device of the present invention includes, as the beam intensity adjusting means, polarization control means for controlling the polarization direction of the light entering the diffraction means.

In the optical pickup device of the present invention, it is preferable that the first photo detecting section detects the main beam entering via a first analyzer, and the second photo-detection means detects the sub beams entering via second analyzers. In this case, the main beam and the sub beams are optically split from each other, and are detected independently of each other. Therefore, it is possible to detect the control signals further stably, and a further preferable recording and/or reproducing performance can be realized.

The optical disc device of the present invention performs at least one of reproduction, recording and deletion of information on an optical disc having a plurality of recording layers and includes: a light source; diffraction means for generating a main beam and a pair of sub beams by diffracting at least a part of the light outputted from the light source, the main beam being a zeroth-order light beam, and the pair of sub beams being a positive first-order light beam and a negative first-order light beam which are located on both sides of the zeroth-order light beam and each has a polarization direction approximately perpendicular to a polarization direction of the main beam; an objective lens for converging the main beam and the pair of sub beams, which are diffracted by the diffraction means, on a desired one of the plurality of recording layers included in the optical disc, first photo-detection means for detecting the main beam which is converged by the objective lens and then reflected from the optical disc; second photo-detection means composed of a plurality of photodetectors for detecting the sub beams which are converged by the objective lens and then reflected from the optical disc; calculation means for calculating a differential output obtained from light intensity detected by the first photo-detection means and a differential output obtained from light intensity detected by the second photo-detection means, and for generating a tracking error signal; and control means for controlling tracking in accordance with the tracking error signal generated by the calculation means.

According to the above-described configuration, it is possible to stably detect the control signals such as the tracking error signal and the focusing error signal, and thus a preferable recording and/or reproducing performance can be realized.

Further, the optical disc-device according to the present invention may preferably includes beam intensity ratio adjusting means for controlling a polarization direction of light entering the diffraction means, and for adjusting a light intensity ratio of the main beam to the sub beams, which are generated by the diffraction means, to a predetermined value.

Still further, the optical disc device of the present invention may preferably includes, as the beam intensity ratio adjusting means, polarization control means for controlling the polarization direction of the light entering the diffraction means.

In the optical disc device of the present invention, it is preferable that the first photo-detection means detects the main beam entering via a first analyzer, and the second photo-detection means detects the sub beams entering via second analyzers. In this case, the main beam and the sub beams are optically split from each other, and are detected independently of each other. Therefore, it is possible to detect the control signal further stably, and a further preferable recording and/or reproducing performance can be realized.

According to the present invention, a stable tracking control can be realized with respect to the optical disc having a plurality of information recording layers. Therefore, it is possible to realize an optical pickup device and an optical disc device which are compact and low-cost, and have a superior recording performance.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
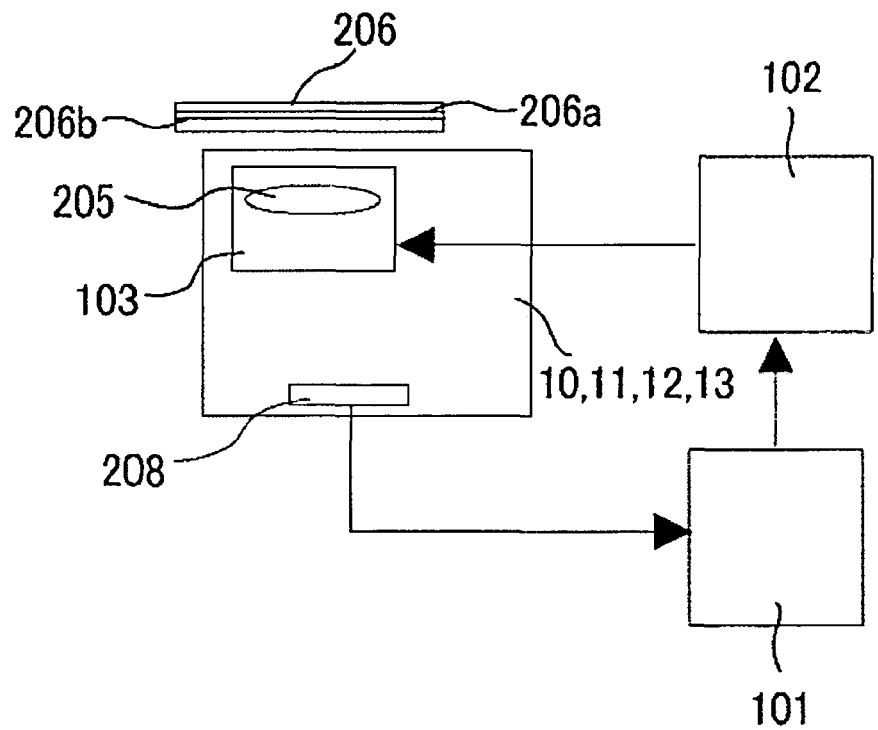
FIG. 1 is a diagram showing a basic configuration of an optical pickup device.

Hereinafter, with reference to drawings, optical pickup devices according to respective embodiments of the present invention will be described. Those component parts which are identical with those in the conventional example are described by using common drawings and common reference characters.

Embodiment 1

FIG. 1 is a diagram showing a basic configuration of an optical pickup device. The optical pickup device shown in FIG. 1 records information on and reproduces information from an optical disc 206 which has two information recording layers, i.e., a first information recording layer 206a, and a second information recording layer 206b.

Figure 2:
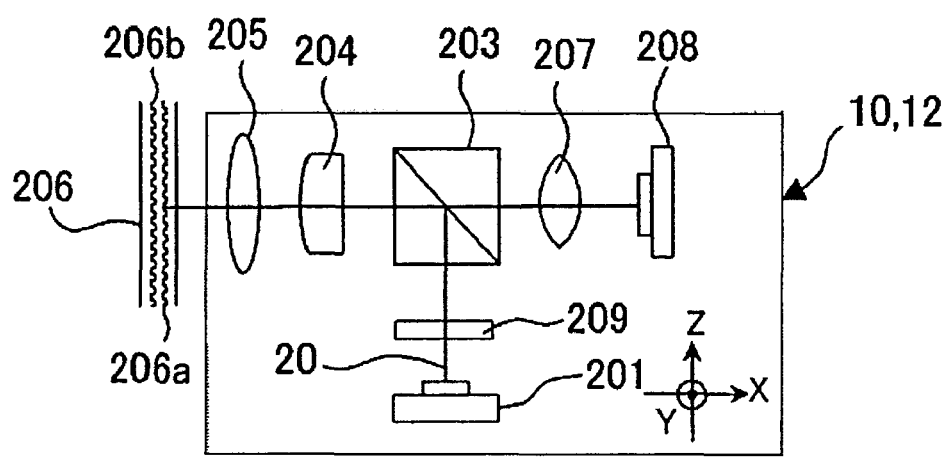
FIG. 2 is a block diagram showing a configuration of an optical system included in the optical pickup device according to embodiment 1 of the present invention.

FIG. 2 is a block diagram showing a configuration of an optical system included in the optical pickup device according to embodiment 1 of the present invention, and shows, in detail, an optical system 10 of the optical pickup device shown in FIG. 1. A light beam outputted from a laser source 201 enters a polarization hologram 209, and is split by a diffraction grating of the polarization hologram 209 into three light beams, i.e., a zeroth-order diffracted ray (main beam), a first-order diffracted rays (sub beams) which are located both sides of the zeroth-order light beam. The three light beams generated by diffraction by the polarization hologram 209 are reflected by the beam splitter 203, passes through a collimator lens 204 and an objective lens 205, and then forms three light spots on the first information recording layer 206a of the optical disc 206. In this case, suppose that the light beams are in focus on the first information recording layer 206a. The reflected main beam and the reflected sub beams, which are reflected by the first information recording layer 206a of the optical disc 206, pass through the objective lens 205, the collimator lens 204, the beam splitter 203, and a detection lens 207, and then enter a photodetector 208.

Figure 3:
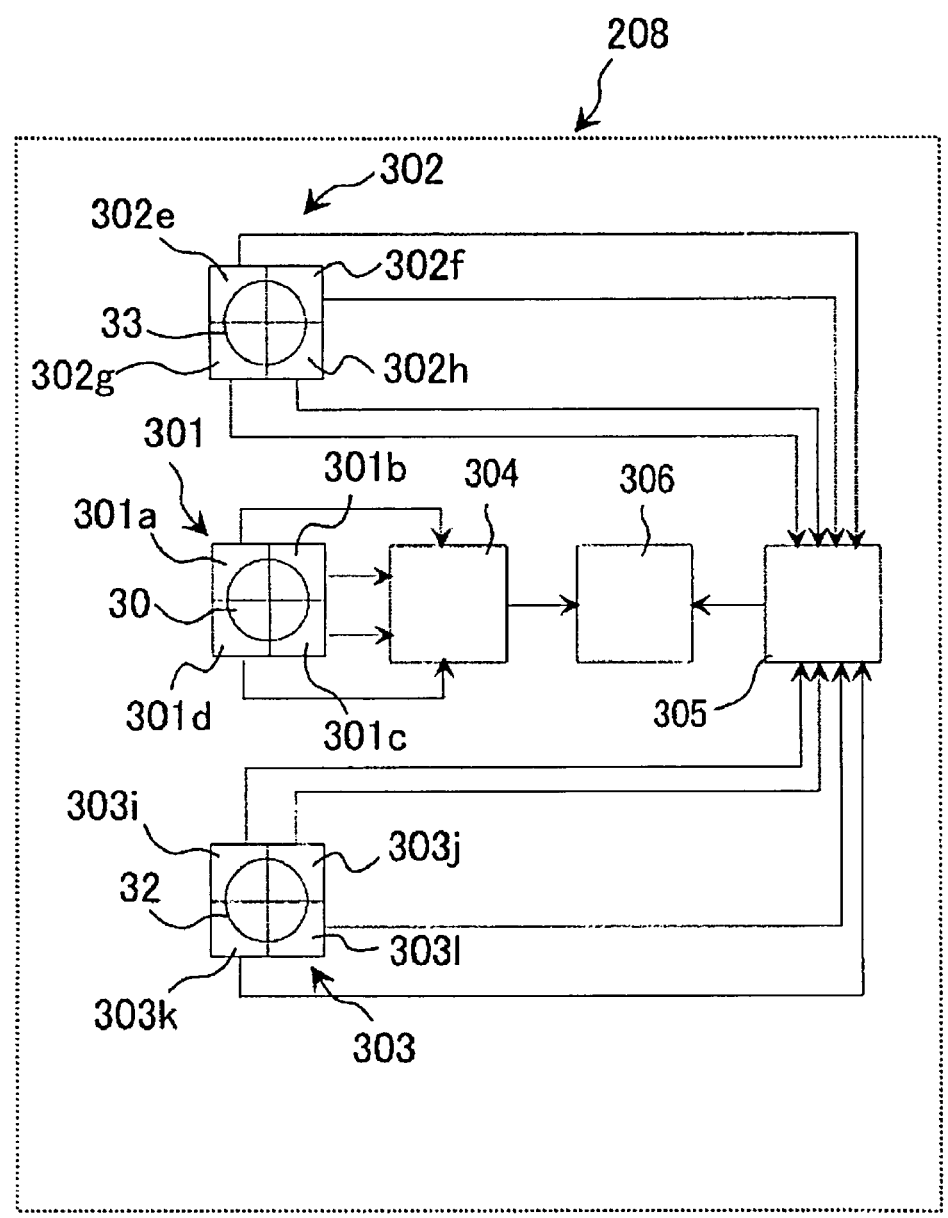
FIG. 3 is a diagram showing, in detail, a configuration of a photodetector shown in FIG. 1.
Figure 4:
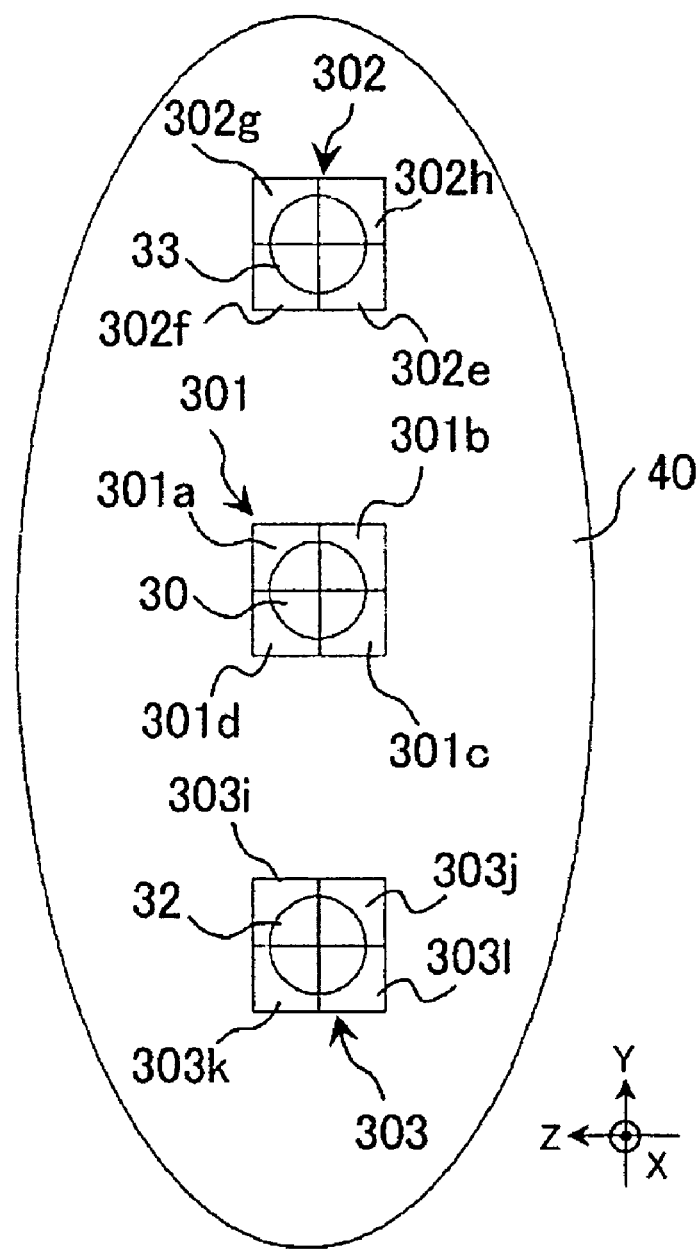
FIG. 4 is a diagram showing a relation between the photodetector and reflected light beams shown in FIG. 3.

FIG. 3 is a diagram showing, in detail, a configuration of the photodetector 208 shown in FIG. 1. FIG. 4 is a diagram showing a relation between the photodetector shown in FIG. 3 and reflected light beams. As shown in FIG. 3, the photodetector 208 has a main beam detecting section 301 which receives a reflected main beam 30 reflected from the optical disc 206, and sub beam detecting sections 302 and 303 which receive reflected sub beams 31 and 32, respectively, reflected from the optical disc 206. Through photoelectric conversion, electric signals corresponding to light intensity recognized at the respective detecting sections are outputted from the photodetector 208.

The main beam detecting section 301 is divided into four detecting elements 301a, 301b, 301c and 301d. The sub beam detecting section 302 is divided into four detecting elements 302e, 302f, 302g and 302h. The sub beam detecting section 303 is divided into four detecting elements 303i, 303j, 303k and 303l.

The divided detecting elements 301a, 301b, 301c, 301d, 302e, 302f, 302g, 302h, 303i, 303j, 303k and 303l output signals A, B, C, D, E, F, G, H, I, J, K and L, respectively. Calculations based on the following equations 8 to 14 are performed by using the signals A to L, whereby a tracking error (TE) signal and a focusing error (FE) signal are generated. The FE signal and the TE signal are detected by a known astigmatic method and by a known push-pull method, respectively. More specifically, in accordance with the signals A to D outputted from the main beam detecting section 301, a main signal calculation circuit 304 generates a main push-pull (MPP) signal and a main focusing error (MFE) signal. In accordance with the signals E to L outputted from the sub beam detecting sections 302 and 303, a sub signal calculation circuit 305 generates a sub push-pull (SPP) signal and a sub focusing error (SFE) signal. The control signal calculation circuit 306 generates the tracking error (TE) signal, the focusing error (FE) signal, and an information (RF) signal.

The above-described calculations performed in the main signal calculation circuit 304, the sub signal calculation circuit 305, and the control signal calculation circuit 306 are executed in accordance with the following equations 8 to 14.

$$MPP=(A+D)-(B+C) \quad (8)$$

$$MFE=(A+C)-(B+D) \quad (9)$$

$$SPP=\{(E+G)-(F+H)\}+\{(I+K)-(J+L)\} \quad (10)$$

$$SFE=\{(E+H)-(F+G)\}+\{(I+L)-(J+K)\} \quad (11)$$

$$TE=MPP-\alpha \times SPP \quad (12)$$

$$FE=MPP+\beta \times SPP \quad (13)$$

$$RF=A+B+C+D \quad (14)$$

Wherein $\alpha$ and $\beta$ are constant numbers.

In accordance with the TE signal and the FE signal generated from the control signal calculation circuit 306 in the photodetector 208, a control signal processing circuit 101 outputs a control signal to an objective lens drive circuit 102 so as to drive an objective lens drive unit 103, and causes the objective lens 205 to move in a thickness direction and a radial direction of the optical disc 206.

Figure 5:
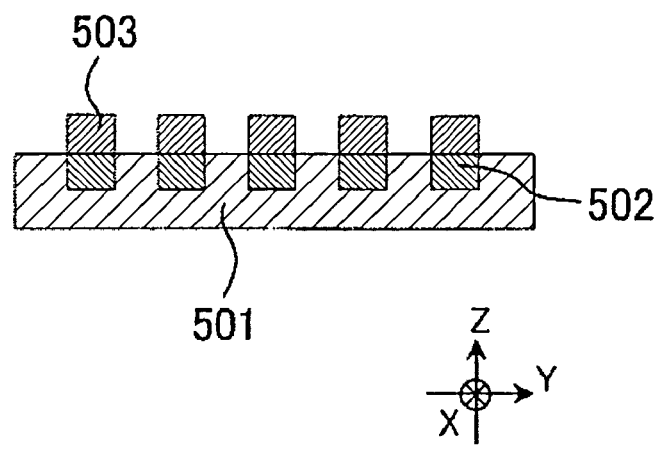
FIG. 5 is a diagram showing a cross-sectional shape of a polarization hologram shown in FIG. 1.

FIG. 5 is a diagram showing a cross-sectional shape of the polarization hologram 209 shown in FIG. 1. On a litium niobate substrate 501, which has double refractivity and has an anisotropy crystal axis oriented along an X-axis direction shown in the drawing, a diffraction grating composed of a proton exchange region 502 and a phase compensation film 503 is formed. For example, $Nb_2O_5$ is used as the phase compensation film 503.

Line portions and space portions of the diffraction grating are formed such that when light (an ordinary ray) having a polarization component oriented along the X-axis direction (which is perpendicular to the sheet of FIG. 5) enters, phase difference between the light passed through the line portions and the light passed through the space portions is 0, whereas when light (an extraordinary ray) having a polarization component oriented along an Y-axis direction (the left-right direction in FIG. 5) perpendicular to the X-axis direction enters, the phase difference between the light passed through the line portions and the light passed through the space portions is $\pi$.

The light outputted from the semiconductor laser, which is used as the laser source 201, is linearly polarized light which oscillates in a predetermined direction. A ratio (polarization ratio) of a polarization component, which is parallel to the predetermined direction, to a polarization component perpendicular to the former polarization component is generally 100:1 or more. In the optical pickup device according to the present embodiment, a polarization direction of a component, which is included in the light outputted from the laser source 201 and has a highest polarization ratio, corresponds to the X-axis direction.

The line portions and the space portions of the diffraction grating formed on the polarization hologram 209 of the optical pickup device according to the present embodiment are arranged such that when a light component (ordinary ray), of the light outputted from the laser source 201, having the highest polarization ratio (having the polarization direction oriented along the X-axis direction) enters, then the phase difference between the light passed through the line portions and the light passed through the space portions is 0, whereas when a light component (extraordinary ray) having the polarization direction oriented along the Y-axis direction, which is perpendicular to the X-axis direction, enters, then the phase difference between the light passed through the line portions and the light passed through the space portions is $\pi$. Therefore, a main component of the light outputted from the laser source 201 transmits through the polarization hologram 209 without being diffracted thereby, and constitutes a main beam (zeroth-order diffracted ray), whereas a polarization component, which is perpendicular to the main component, is diffracted, and then constitutes sub beams (first-order diffracted rays).

As a result, the polarization direction of the main beam, which is the zeroth-order diffracted ray, is perpendicular to the polarization direction of the sub beams, which are the first-order diffracted rays. For example, when the polarization ratio of the semiconductor laser used as the laser source 201 is 100:1, the light intensity ratio of the main beam to the sub beams is 100:1.

The main beam and the sub beams are reflected by the beam splitter 203, and the polarization direction of the main beam is changed to a direction along a Z-axis direction, whereas the polarization direction of each of the sub beams is changed to a direction along the Y-axis direction. The main beam and the sub beams enter the optical disc 206 via the collimator lens 204 and the objective lens 205. The main beam and the sub beams reflected from the optical disc 206 again travel through the objective lens 205 and the collimator lens 204, transmit through the beam splitter 203, and enter the photodetector 208 via the detection lens 207. In this case, the polarization direction of the reflected main beam is parallel to the Z-axis direction, whereas the polarization direction of each of the reflected sub beams is parallel to the Y-axis direction. That is, the polarization direction of the reflected main beam and the polarization direction of the reflected sub beams, both of which enter the photodetector 208, remain perpendicular to each other.

When the light beams are in focus on the first information recording layer 206a, a part of the light beams transmits through the first information recording layer 206a, and enters the second information recording layer 206b in a defocused state. The light reflected from the second information recording layer 206b travels through the objective lens 205, the collimator lens 204, and beam splitter 203, and enters the photodetector 208 via the detection lens 207 in the same manner as the light reflected from the first information recording layer 206a. Of the reflected light from the second information recording layer 206b, the reflected main beam 40 enters the photodetector 208 in a defocused state, and enters respective light detecting elements 301a, 301b, 301c, 301d, 302e, 302f, 302g, 302h, 303i, 303j, 303k and 303l included in the photodetector 208, as shown in FIG. 4.

In the case where there is a plurality of light beams having various polarization directions, light beams having a common polarization direction interfere with one another. When the light beams interfere with one another, light intensity of each of the light beams is superimposed with one another in accordance with a phase of each of the light beams at a measuring point. Accordingly, if the light beams are in phase, the light intensity of each of the light beams is added up, whereas if the light beams are in opposite phase to one another, the light intensity is cancelled with one another. In this manner, the light intensity is increased or decreased.

In the optical pickup device of the present embodiment, the polarization direction of the reflected main beam is the Z-axis direction, and the polarization direction of each of the reflected sub beams is the Y-axis direction, as above described. That is, both directions are perpendicular to each other. Therefore, in FIG. 4, the reflected sub beams 32 and 33 which enter the sub beam detecting section 302 and 303, respectively, and the reflected main beam 40 reflected from the second information recording layer 206b will not interfere with one another. On the other hand, the reflected main beam 30 which is reflected from the first information recording layer 206a and enters the main beam detecting section 301, and the reflected main beam 40 reflected from the second information recording layer 206b interfere with each other since both of the reflected main beam 30 and the reflected main beam 40 have a common polarization direction (Z-axis direction).

Generally, the light outputted from the semiconductor laser, which is used as the laser source 201, has a continuous light intensity distribution, in which the light intensity is the strongest at center of the light, and the light intensity decrease as distance from the center increases. Therefore, each of the main beam and the sub beams, which are generated by the polarization hologram 209, maintains the continuous light intensity distribution, and is converged on the optical disc 206. Further, the continuity of the light intensity distribution of each of the reflected main beam and the reflected sub beams, which enter the photodetector 208 after reflection, is maintained. In accordance with equations 8 to 13, the TE signal and the FE signal are generated from the reflected main beam and the reflected sub beams each having the continuous light intensity distribution, whereby stable control can be realized.

Therefore, the reflected main beam 40 which is reflected from the second information recording layer 206b and enters the sub beam detecting sections 302 and 303, and the reflected sub beams 31 and 32 which are reflected from the first information recording layer 206a are not interfere with each other, and thus the light intensity is neither increased nor decreased. Accordingly, the continuity of the light intensity distribution of each of the reflected sub beams 31 and 32 reflected from the first information recording layer 206a is maintained, and in accordance with equations 10 and 11, the SPP signal and the SFE signal can be obtained more appropriately.

On the other hand, the reflected main beam 30 from the first information recording layer 206a interferes with the reflected main beam 40 from the second information recording layer 206b. However, since the reflected main beam 40 from the second information recording layer 206b enters the detecting sections 301, 302, and 303 in a defocused state, the light intensity of the reflected main beam 40 is significantly smaller than the light intensity of the reflected main beam 30, and consequently the increase or decrease in the light intensity which is caused by the interference between the reflected main beam 40 and the reflected main beam 30 on the main beam detecting section 301 is significantly small. Therefore, continuity of the light intensity distribution of each of the reflected main beams 30 and 40 is hardly affected, and thus the MPP signal and the MFE signal can be obtained more appropriately in accordance with equations 8 and 9.

A part of the sub beams also enters the second information recording layer 206b, is reflected therefrom, and then enters the photodetector 208 in a defocused state. However, a proportion of the sub beams relative to the main beam is small. Therefore, intensity of the part of the sub beams reflected from the second information recording layer 206b is significantly smaller than the light intensity of each of the reflected main beam 30 from the first information recording layer 206a and the reflected sub beams 31 and 32 from the first information recording layer 206a. Accordingly, the MPP signal, the MFE signal, the SPP signal, and the SFE signal, which are obtained in accordance with equations 8 to 11 are hardly affected.

According to the above-described configuration, at the time of performing recording on and/or reproducing from an optical disc having a plurality of information recording layers, it is possible to prevent beams reflected from an information recording layer, which undergoes recording and/or reproducing, from being affected by the stray light reflected by another information recording layer. Accordingly, it is possible to detect the tracking signal and the focusing error signal stably, whereby a preferable recording and/or reproducing performance can be realized.

In the present embodiment, the configurations of the optical system and the photodetector have been described by using the examples shown in FIG. 2 to FIG. 4. However, the optical pickup device may be configured with other optical system and photodetector in other configurations. In such a case as well, the same effect as that of the present embodiment can be obtained.

The configurations of the respective circuits included in the optical pickup device according to the present embodiment are merely examples, and other circuit configurations may be applied. For example, the signal calculation circuit 101 may include a function of the objective lens drive circuit 105.

In the present embodiment, the respective calculation circuits, which calculate the respective signals obtained from the optical disc, are not necessarily included in the optical pickup device, but may be included in the optical disc device.

Hereinafter, as exemplary modifications of the present embodiment, configurations in which the light intensity ratio of the main beam to the sub beams is adjustable will be described.

Modification 1 of Embodiment 1

As above described, the line portions and the space portions of the diffraction grating included in the polarization hologram 209 are formed such that, when light (ordinary ray) having a polarization component oriented along the X-axis direction enters, the phase difference between the light passed through the line portions and the light passed through the space portions is 0, whereas when the light (extraordinary ray) having the polarization component oriented along the Y-axis direction, which is perpendicular to the X-axis, enters, the phase difference between the light passed through the line portions and the light passed through the space portions is $\pi$. Accordingly, of the light which is outputted from the laser source 201 and enters the polarization hologram 209, the ordinary ray which transmits through the polarization hologram 209 without being diffracted thereby constitutes the main beam, and the extraordinary ray which is diffracted thereby constitutes the sub beams.

In this case, a ratio of the ordinary ray to the extraordinary ray which are included in the light incident on the polarization hologram 209 is equal to a ratio of the main beam to the sub beams. Therefore, in order to set the light intensity ratio of the main beam to the sub beams, the light intensity ratio of the ordinary ray to the extraordinary ray of the light incident on the polarization hologram 209 is adjusted.

In FIG. 2, a configuration will be considered in which the laser source 201 is rotated about its optical axis 20 (Z-axis direction), and an angle of the laser source 201 relative to the polarization hologram 209 is adjustable such that a polarization direction of a component having a highest polarization ratio is different from the X-axis direction.

In this case, according to a rotation angle of the laser source 201, the light intensity ratio of the ordinary ray to the extraordinary ray, which enter the polarization hologram 209, is adjusted, and thus it is possible to change the light intensity ratio of the main beam to the sub beams which enter the optical disc 206 as well as the light intensity ratio of the main beam to the sub beams which are detected by the photodetector 208.

With the above-described configuration, intensity of each of the signals generated in accordance with equations 8 to 14 can be adjusted appropriately, and signals of preferable quality can be detected. Accordingly, it is possible to stably perform tracking control and focusing control in the optical pickup device, and also possible to realize a preferable recording and/or reproducing performance.

Modification 2 of Embodiment 1

Figure 6:
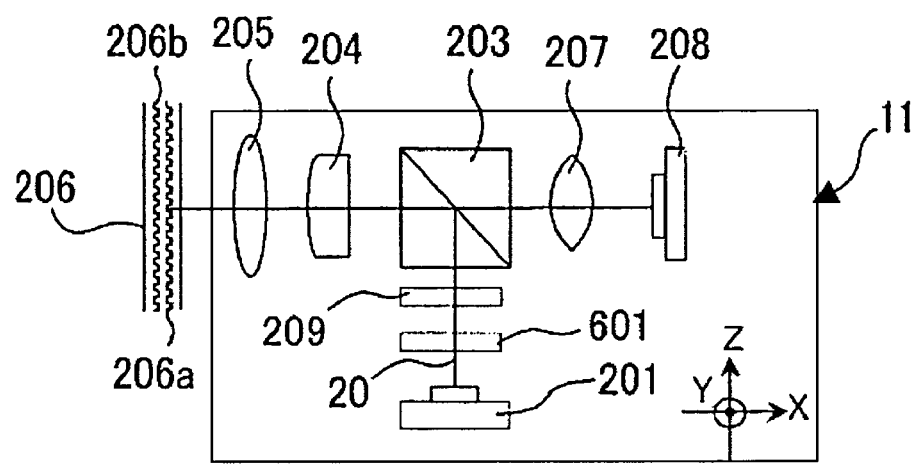
FIG. 6 is a diagram showing another configuration of the optical system shown in FIG. 1.

FIG. 6 is a diagram showing another configuration of the optical system shown in FIG. 1. In the optical system 11 shown in FIG. 6, a ½ wave plate 601 is additionally included so as to control the polarization direction of the light incident on the polarization hologram 209, and to adjust the light intensity ratio of the main beam to the sub beams.

In the optical system 11, the light outputted from the laser source 201 passes through the ½ wave plate 601, and enters the polarization hologram 209. The ½ wave plate 601 causes the polarization direction of the incident light to rotate around the optical axis 20 by a predetermined degree. In other words, in accordance with a rotation angle caused by the ½ wave plate 601, the light intensity ratio of the ordinary ray to the extraordinary ray, which enter the polarization hologram 209, is adjusted, and thus it is possible to change the light intensity ratio of the main beam to the sub beams which enter the optical disc 206 as well as the light intensity ratio of the main beam to the sub beams which are detected by the photodetector 208.

With the above-described configuration, the intensity of each of the signals generated in accordance with equations 8 to 14 can be adjusted appropriately, and signals of preferable quality can be detected. Accordingly, it is possible to stably perform the tracking control and the focusing control in the optical pickup device, and also possible to realize a preferable recording and/or reproducing performance.

Modification 3 of Embodiment 1

Further, in order to adjust the light intensity ratio of the main beam to the sub beams, the following configuration maybe considered. In the present modification, the polarization hologram 209 is formed such that the anisotropy crystal axis of the litium niobate substrate 501 has a predetermined angle relative to a lattice direction (X-axis direction) of the diffraction grating in the example shown in FIG. 2.

In this case, of the light incident on the polarization hologram 209, the light having the polarization direction oriented along the anisotropy crystal axis is the ordinary ray, and the light having the polarization direction oriented perpendicular to the anisotropy crystal axis is the extraordinary ray. The phase difference between the light passed through the line portions and the light passed through the space portions is 0 (in the case of the ordinary ray) or $\pi$ (in the case of the extraordinary ray), and thus the ordinary ray is not diffracted by the polarization hologram 209, and constitutes the main beam, whereas the extraordinary ray is diffracted, and constitutes the sub beams.

Accordingly, the lattice direction of the diffraction grating and the anisotropy crystal axis are arranged so as to have a predetermined angle relative to each other. Therefore, of the light components which are outputted from the laser source 201 having a constant polarization ratio and enter the polarization hologram 209, it is possible to set a ratio of a light component which constitutes the ordinary ray to a light component which constitutes the extraordinary ray to a desired value. It is also possible to change the light intensity ratio of the main beam to the sub beams which enter the optical disc 206 as well as the light intensity ratio of the main beam to the sub beams which are detected by the photodetector 208.

With the above-described configuration, the intensity of each of the signals generated in accordance with equations 8 to 14 can be set appropriately, and thus signals of preferable quality can be detected. Accordingly, it is possible to stably perform the tracking control and the focusing control in the optical pickup device, and also possible to realize a preferable recording and/or reproducing performance.

Another Modification

It is possible to adjust the light intensity ratio of the main beam to the sub beams by combining the above-described configurations, and effects obtained from such combined configurations are the same as those of the above-described examples.

Further, the light intensity ratio of the main beam to the sub beams may be arbitrarily changed by using any of the above-described configurations in which the light intensity ratio of the main beam to the sub beams is adjustable. For example, it may be possible to switch the light intensity ratio of the main beam to the sub beams between when reproduction from the optical disc is performed and when recording on the optical disc is performed.

Generally, when information is recorded on an optical disc, the light intensity of the main beam needs to be increased. Therefore, by increasing the light intensity ratio of the main beam at the time of recording, the light intensity suitable for recording can be obtained, whereby a further preferable recording performance can be realized. On the other hand, by decreasing the light intensity ratio of the main beam at the time of reproducing from the optical disc, the light intensity of the reflected main beam 40 from the second information recording layer 206b, which is not the target to be read, is also decreased, whereby it is possible to improve the detection accuracy of the signals, and also possible to obtain a further preferable reproducing performance.

With the above-described configuration, it is possible to realize a further preferable recording and/or reproducing performance.

Embodiment 2

Figure 7:
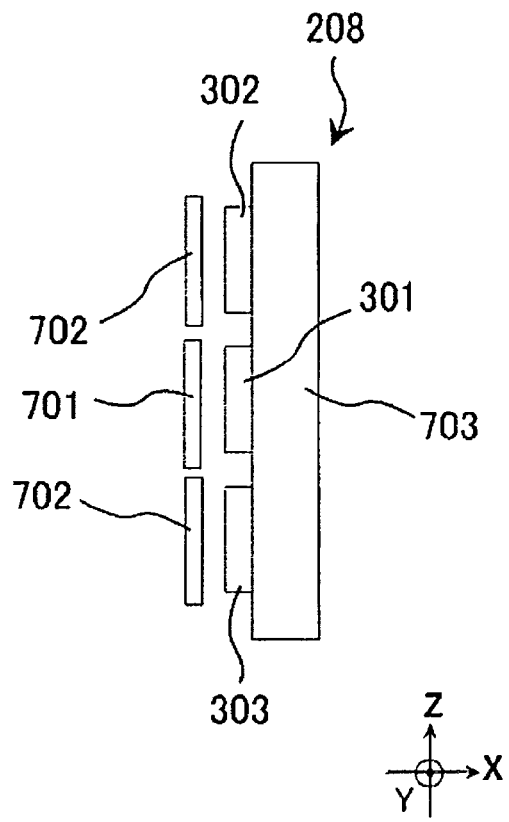
FIG. 7 is a side view showing a configuration of a photodetector included in an optical pickup device according to embodiment 2 of the present invention.
Figure 8:
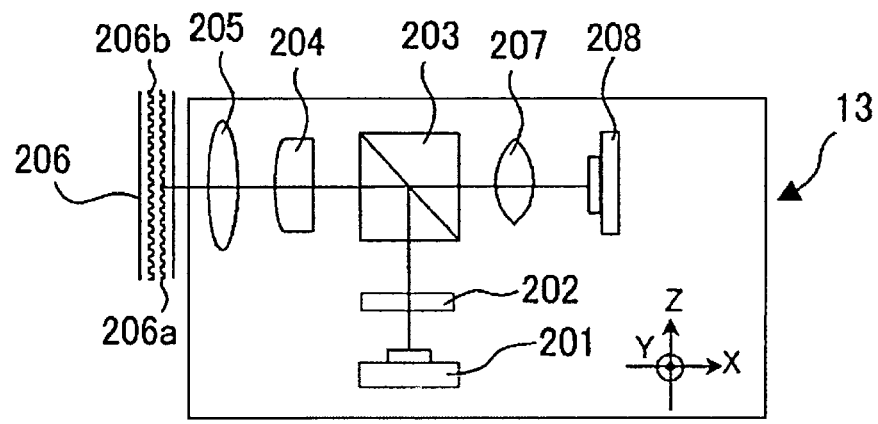
FIG. 8 is a block diagram showing a configuration of a conventional optical system used in an optical pickup device.

FIG. 7 is a side view showing a configuration of a photodetector included in an optical pickup device according to embodiment 2 of the present invention. The optical pickup device according to the present embodiment includes a first analyzer 701 and a pair of second analyzers 702, in addition to the configuration of the optical pickup device according to embodiment 1. Accordingly, in the following description, FIGS. 1 to 5 are also referred to in conjunction with FIG. 7.

As shown in FIG. 7, in the present embodiment, the first analyzer 701 is arranged so as to face the main beam detecting section 301 on the photodetector 208, whereas the pair of second analyzers 702 are arranged so as to face the sub beam detecting sections 302 and 303. The first analyzer 701 has a function of causing a light beam component having a polarization direction along the Z-axis to transmit, among the light beam components incident on the main beam detecting section 301. The second analyzers 702 each has a function of causing a light beam component having a polarization direction along the Y-axis to transmit, among the light beam components incident on the sub beam detecting sections 302 and 303.

As described with reference to FIG. 5, the polarization hologram 209 is composed of the litium niobate substrate 501 which has double refractivity and has the anisotropy crystal axis oriented along the X-axis direction, and the diffraction grating which has the proton exchange region 502 and the phase compensation film 503. The line portions and the space portions of the diffraction grating are formed such that when light (an ordinary ray) having a polarization component oriented along the X-axis direction enters, phase difference between the light passed through the line portions and the light passed through the space portions is 0, whereas when light (an extraordinary ray) having a polarization component oriented along the Y-axis direction perpendicular to the X-axis direction enters, the phase difference between the light passed through the line portions and the light passed through the space portions is π. In the present embodiment, a polarization direction of a component, which is included in the light outputted from the laser source 201 and has the highest polarization ratio, also corresponds to the X-axis direction.

Therefore, the main light component outputted from the laser source 201 transmits through the polarization hologram 209 without being diffracted thereby, and constitutes the main beam (zeroth-order diffracted ray), whereas the polarization component which is perpendicular to the main light component is diffracted, and constitutes the sub beams (first-order diffracted rays).

The polarization direction of the main beam, which is the zeroth-order diffracted ray, and the polarization direction of the sub beams, which are the first-order diffracted rays, are perpendicular to each other. For example, in the case where the polarization ratio of the semiconductor laser used as the laser source 201 is 100:1, the light intensity ratio of the main beam to the sub beams is 100:1.

The main beam and the sub beams are reflected by the beam splitter 203, and the polarization direction of the main beam is changed to a direction along the Z-axis direction, whereas the polarization direction of the sub beams is changed to a direction along the Y-axis direction. The main beam and the sub beams enter the optical disc 206 via the collimator lens 204 and the objective lens 205. The main beam and the sub beams reflected by the optical disc 206 travel through the objective lens 205 and the collimator lens 204, transmits through the beam splitter 203, and enter the photodetector 208 via the detection lens 207. In this case, the polarization direction of the reflected main beam is parallel to the Z-axis direction, and the polarization direction of the reflected sub beams is parallel to the Y-axis direction. That is, the polarization direction of the reflected main beam and that of the reflected sub beams, which enter the photodetector 208, remain perpendicular to each other.

In the case where the light beams are in focus on the first information recording layer 206a, a part of the light incident on the optical disc 206 transmits through the first information recording layer 206a, and enter the second information recording layer 206b in a defocused state. The light reflected by the second information recording layer 206b travels though the objective lens 205, the collimator lens 204, and the beam splitter 203, and enters the photodetector 208 via the detection lens 207, in the same manner as the light reflected from the first information recording layer 206a. Of the reflected light, the reflected main beam enters the photodetector 208 in a defocused state. However, since the polarization direction of the reflected main beam is parallel to the Z-axis, the reflected main beam transmits through the first analyzer 701 shown in FIG. 7, and enters the light detecting elements 301a, 301b, 301c, and 301d. However, the reflected main beam cannot transmit through the second analyzers 702 to enter the sub beam detecting sections 302 and 303. As a result, the sub beam detecting sections 302 and 303 detect only the reflected sub beams 31 and 32 from the first information recording layer 206a, and thus the SPP signal and the SFE signal can be obtained appropriately in accordance with equations 10 and 11.

On the other hand, each of the reflected main beam 30 from the first information recording layer 206a and the reflected main beam 40 from the second information recording layer 206b has the polarization direction parallel to the Z-axis direction, and thus transmits through the first analyzer 701. Therefore, the reflected main beam 30 interferes with the reflected main beam 40 on the main beam detecting section 301. However, the reflected main beam 40 from the second information recording layer 206b enters the main beam detecting section 301 in a defocused state, and thus the light intensity is significantly smaller than the light intensity of the reflected main beam 30 from the first information recording layer 206a. Therefore, a degree of the increase or decrease caused by the light interference between the reflected main beams 30 and 40 on the main beam detecting section 301 is significantly small, and the continuity of the light intensity distribution of each of the reflected main beams 40 and 30 is hardly affected. Accordingly, the MPP signal and the MFE signal can be obtained appropriately in accordance with equations 8 and 9. In this case, each of the reflected sub beams, which enter the second information recording layer 206b and are reflected therefrom, has the polarization direction parallel to the Y-axis direction, and thus cannot transmit through the first analyzer 701 or enter the main beam detecting section 301. Therefore, the MPP signal and the MFE signal can be detected without being affected by the reflected sub beams which are reflected from the second information recording layer 206b and in a defocused state.

As above described, when the polarization direction of the main beam is perpendicular to the polarization direction of the sub beams, it is possible to optically split the reflected main beam from the reflected sub beams by using the first analyzer and the second analyzers, and accordingly, it is possible to allow the main beam and the sub beams to enter the main beam detecting section and the sub beam detecting section, respectively. Therefore, when recording and/or reproducing of the optical disc having a plurality of information recording layers is performed, it is possible to prevent beams reflected from an information recording layer, which undergoes recording and/or reproducing, from being affected by the stray light reflected by another information recording layer. Accordingly, it is possible to detect the tracking signal and the focusing error signal stably, whereby a preferable recording and/or reproducing performance can be realized.

The optical pickup device of the present embodiment may have a configuration in which the first analyzer 701 is not included, and the photodetector 208 includes the second analyzers 702 only. In this case, the polarization direction of the reflected main beam 30, which is reflected from the first information recording layer 206a and enters the main beam detecting section 301, and the polarization direction of the reflected main beam 40, which is reflected from the second information recording layer 206b and enters the main beam detected section 301, are parallel to each other, and are oriented along the Z-axis direction. Therefore, the reflected main beams 30 and 40 interfere with each other. However, in this case as well, the reflected main beam 40 from the second information recording layer 206b enters the main beam detecting section 301 in the defocused state, and thus the light intensity is significantly smaller than the light intensity of the reflected main beam 30 from the first information recording layer 206a. Further, the degree of the increase or decrease in the light intensity caused by the light interference between the reflected main beams 30 and 40 on the main beam detecting section 301 is significantly small. Therefore, the continuity of the light intensity distribution of each of the reflected main beams 40 and 30 is hardly affected. Accordingly, the MPP signal and the MFE signal can be obtained appropriately in accordance with equations 8 and 9.

In the present embodiment, the case has been described where the photodetector 208 includes the first analyzer 701 and the second analyzers 702. However, the first analyzer 701 and the second analyzers 702 are not necessarily included in the photodetector 208, but may be arranged between the detection lens 207 and the photodetector 208.

In the present embodiment, the configurations of the optical system and the photodetector have been described by using the examples shown in FIGS. 2, 3 and 7. However, the optical pickup device may be configured with any optical system and photodetector having other configurations. In such a case as well, the same effect as the present embodiment can be obtained.

The configuration of each of the circuits included in the optical pickup device of the present embodiment is merely an example, and circuits having other configuration may be used. For example, the signal calculation circuit 101 may include a function of the objective lens drive circuit 105.

Further, in the present embodiment, the respective calculation circuits, which calculates respective signals obtained from the optical disc, are not necessarily included in the optical pickup device, but may be included in the optical disc device.

Modification 1 of Embodiment 2

Further, in FIG. 2, the optical pickup device may be configured such that the laser source 201 is rotatable around the optical axis 20 (direction along the Z-axis) and the polarization direction of a component having the highest polarization ratio can be adjusted so as to have a predetermined angle relative to the X-axis direction. By adjusting the light intensity ratio of the ordinary ray to the extraordinary ray, which are included in the light outputted from the laser source 201 and enter the polarization hologram 209, to a predetermined value, it is possible to change the light intensity ratio of the main beam to the sub beams which enter the optical disc 206, that is, the light intensity ratio of the main beam to the sub beams detected by the photodetector 208. Therefore, intensity of each of the signals generated in accordance with equations 8 to 14 can be adjusted appropriately, and signals of preferable quality can be detected. Accordingly, it is possible to stably perform the tracking control and the focusing control in the optical pickup device, and also possible to realize a preferable recording and/or reproducing performance.

Modification 2 of Embodiment 2

As shown in FIG. 6, a ½ wave plate 601 may be added which causes the polarization direction of the incident light to rotate around the optical axis 20 by a predetermined degrees such that the polarization direction of the light incident on the polarization hologram 209 is controlled and that the light intensity ratio of the main beam to the sub beams is adjusted. In this case, in accordance with a rotation angle of the ½ wave plate 601, the light intensity ratio of the ordinary ray and the extraordinary ray which enter the polarization hologram 209 is adjusted. Accordingly, it is possible to change the light intensity ratio of the main beam to the sub beams which enter the optical disc 206, that is, the light intensity ratio of the main beam to the sub beams which are detected by the photodetector 208. Therefore, the intensity of each of the signals generated in accordance with equations 8 to 14 can be adjusted appropriately, and signals of preferable quality can be detected. Accordingly, it is possible to stably perform the tracking control and the focusing control in the optical pickup device, and also possible to realize a preferable recording and/or reproducing performance.

Modification 3 of Embodiment 2

Further, in order to adjust the light intensity ratio of the main beam to the sub beams, the polarization hologram 209 may be configured such that the anisotropy crystal axis direction of the litium niobate substrate 501 has a predetermined angle relative to the direction of the diffraction grating (X-axis direction shown in FIG. 2). In this case, of the light which is outputted from the laser source 201 having a predetermined polarization ratio and enters the polarization hologram 209, the light intensity ratio of the ordinary ray to the extraordinary ray may be adjusted to a predetermined value. Therefore, it is possible to change the light intensity ratio of the main beam to the sub beams which enter the optical disc 206, that is, the light intensity ratio of the main beam to the sub beams which are detected by the photodetector 208. Therefore, the intensity of each of the signals generated in accordance with equations 8 to 14 can be adjusted appropriately, and signals of preferable quality can be detected. Accordingly, it is possible to stably perform the tracking control and the focusing control in the optical pickup device, and also possible to realize a preferable recording and/or reproducing performance.

Another Modification

It is possible to adjust the light intensity ratio of the main beam to the sub beams by combining the above-described configurations, and effects obtained from such confined configurations are the same as those of the above-described examples.

Further, the light intensity ratio of the main beam to the sub beams may be changed by using any of the above-described configurations in which the light intensity ratio of the main beam to the sub beams is adjusted. For example, it may be possible to switch the light intensity ratio of the main beam to the sub beams between when reproduction from the optical disc is performed and when recording on the optical disc is performed.

Generally, when information is recorded on an optical disc, the light intensity of the main beam needs to be increased. Therefore, by increasing the light intensity ratio of the main beam at the time of recording, the light intensity suitable for recording can be obtained, whereby a further preferable recording performance can be realized. On the other hand, by decreasing the light intensity ratio of the main beam at the time of reproducing from the optical disc, the light intensity of the reflected main beam 40 from the second information recording layer 206b is decreased, whereby it is possible to improve the detection accuracy of the signals, and also possible to obtain a further preferable reproducing performance.

With the above-described configuration, it is possible to realize a further preferable recording and/or reproducing performance.

As above described, the present invention is useful as an optical pickup device and/or an optical disc device, such as an optical information recording device which is capable of optically recording information on and/or reproducing information from an information recording medium such as an optical disc by using a laser source.

While the invention has been described in detail, the foregoing description is in all aspects illustrative and not restrictive. It is understood that numerous other modifications and variations can be devised without departing from the scope of the invention.

What is claimed is:

1. An optical pickup device performing at least one of reproduction, recording and deletion of information, on an optical disc having a plurality of recording layers, the optical pickup device comprising:
   a light source;
   diffraction means for generating a main beam and a pair of sub beams by diffracting at least a part of the light outputted from the light source, the main beam being a zeroth-order light beam, and the pair of sub beams being a positive first-order light beam and a negative first-order light beam which are located on both sides of the zeroth-order light beam and each has a polarization direction approximately perpendicular to a polarization direction of the main beam;
   an objective lens for converging the main beam and the pair of sub beams, which are diffracted by the diffraction means, on a desired one of the plurality of recording layers;
   first photo-detection means for detecting the main beam which is converged by the objective lens and then reflected by the optical disc; and
   second photo-detection means for detecting the sub beams which are converged by the objective lens and then reflected by the optical disc,
   wherein the diffraction means includes a substrate having double refractivity and a diffraction grating arranged on a surface of the substrate, outputs an incident ordinary beam as the main beam, and generates the pair of sub beams by diffracting an incident extraordinary beam.

2. The optical pickup device according to claim 1 further comprising beam intensity ratio adjusting means for adjusting a light intensity ratio of the main beam to the sub beams, which are generated by the diffraction means, to a predetermined value.

3. The optical pickup device according to claim 2, wherein the beam intensity ratio adjusting means is polarization control means for controlling a polarization direction of light entering the diffraction means.

4. The optical pickup device according to claim 3, wherein the polarization control means is a wave plate.

5. The optical pickup device according to claim 3, wherein the beam intensity ratio adjusting means is realized by setting a lattice direction of the diffraction grating so as to have a predetermined angle relative to a crystal axis direction of the substrate which has double refractivity and is included in the diffraction means.

6. The optical pickup device according to claim 1, wherein
   the first photo-detection means detects the main beam entering via a first analyzer, and
   the second photo-detection means detects the sub beams entering via second analyzers.

7. An optical disc device performing at least one of reproduction, recording and deletion of information, on an optical disc having a plurality of recording layers, the optical device comprising;
   a light source;
   diffraction means for generating a main beam and a pair of sub beams by diffracting at least a part of the light outputted from the light source, the main beam being a zeroth-order light beam, and the pair of sub beams being a positive first-order light beam and a negative first-order light beam which are located on both sides of the zeroth-order light beam and each has a polarization direction approximately perpendicular to a polarization direction of the main beam;
   an objective lens for converging the main beam and the pair of sub beams, which are diffracted by the diffraction means, on a desired one of the plurality of recording layers included in the optical disc,
   first photo-detection means for detecting the main beam which is converged by the objective lens and then reflected from the optical disc;
   second photo-detection means composed of a plurality of photodetectors for detecting the sub beams which are converged by the objective lens and then reflected from the optical disc;
   calculation means for calculating a differential output obtained from light intensity detected by the first photo-detection means and a differential output obtained from light intensity detected by the second photo-detection means, and for generating a tracking error signal; and control means for controlling tracking in accordance with the tracking error signal generated by the calculation means, wherein the diffraction means includes a substrate having double refractivity and a diffraction grating arranged on a surface of the substrate, outputs an incident ordinary beam as the main beam, and generates the pair of sub beams by diffracting an incident extraordinary beam.

8. The optical disc device according to claim 7, further comprising beam intensity ratio adjusting means for adjusting a light intensity ratio of the main beam to the sub beams, which are generated by the diffraction means, to a predetermined value.

9. The optical disc device according to claim 8, wherein the beam intensity ratio adjusting means is polarization control means for controlling a polarization direction of light entering the diffraction means.

10. The optical disc device according to claim 9, wherein the polarization control means is a wave plate.

11. The optical disc device according to claim 9, wherein the beam intensity ratio adjusting means is realized by setting a lattice direction of the diffraction grating so as to have a predetermined angle relative to a crystal axis direction of the substrate which has double refractivity and is included in the diffraction means.

12. The optical disc device according to claim 7, wherein
the first photo-detection means detects the main beam entering via a first analyzer, and
the second photo-detection means detects the sub beams entering via second analyzers.

13. The optical disc device according to claim 8, wherein the beam intensity ratio adjusting means switches the light intensity ratio of the main beam to the sub beams among a plurality of values.

* * * * *